United States Patent [19]

Kimura et al.

[11] Patent Number: 4,772,576

[45] Date of Patent: Sep. 20, 1988

[54] HIGH DENSITY ALUMINA ZIRCONIA CERAMICS AND A PROCESS FOR PRODUCTION THEREOF

[75] Inventors: Nobuo Kimura; Hiromichi Okamura; Junichi Morishita, all of Odawara, Japan

[73] Assignee: Nippon Soda Co., Ltd., Tokyo, Japan

[21] Appl. No.: 52,858

[22] PCT Filed: Sep. 4, 1986

[86] PCT No.: PCT/JP86/00449

§ 371 Date: Apr. 27, 1987

§ 102(e) Date: Apr. 27, 1987

[87] PCT Pub. No.: WO87/01369

PCT Pub. Date: Mar. 12, 1987

[30] Foreign Application Priority Data

Sep. 6, 1985 [JP] Japan ............................ 60-197155
Sep. 24, 1985 [JP] Japan ............................ 60-210710

[51] Int. Cl.$^4$ .................... C04B 35/48; C01G 25/02
[52] U.S. Cl. .................................. 501/105; 423/593; 423/600; 423/608; 501/102
[58] Field of Search ................. 423/600, 608; 501/105

[56] References Cited

U.S. PATENT DOCUMENTS

| | | | |
|---|---|---|---|
| 3,334,962 | 8/1967 | Clearfield | 423/608 |
| 4,279,655 | 7/1981 | Garvie | 423/608 X |
| 4,525,464 | 6/1985 | Claussen | 501/105 X |
| 4,605,631 | 8/1986 | Rossi | 423/608 X |
| 4,627,966 | 12/1986 | Micheli | 423/608 X |

FOREIGN PATENT DOCUMENTS

| | | | |
|---|---|---|---|
| 0131774 | 1/1985 | European Pat. Off. | 423/608 |
| 0140763 | 11/1980 | Japan | 501/105 |
| 0215527 | 10/1985 | Japan | 423/608 |
| 1077665 | 4/1986 | Japan | 501/105 |
| 1083627 | 4/1986 | Japan | 423/608 |

*Primary Examiner*—William R. Dixon, Jr.
*Assistant Examiner*—James M. Hunter, Jr.
*Attorney, Agent, or Firm*—Geroge B. Oujevolk

[57] ABSTRACT

A process for the production of a sinterable raw material powder to be used for the production of a partially stabilized $ZrO_2$ sintered body or ceramic body containing 0 to 60 parts of alumina, and the process for the production of the sintered body or ceramic body using this powder.

7 Claims, No Drawings

HIGH DENSITY ALUMINA ZIRCONIA CERAMICS AND A PROCESS FOR PRODUCTION THEREOF

TECHNICAL FIELD

The present invention relates to high density alumina zirconia ceramics consisting essentially of alumina and zirconia, and further to the method of the production thereof.

The high density alumina-zirconia ceramics of the present invention is very hard and very resistant to abrasion and is very tough, and therefore, can be expected to have a variety of applications such as for a mechanical member, abrasion resistant material, and tool material.

BACKGROUND ART

Alumina ceramic material is famous for use as a cutting tool material and has high abrasion resistance, but has certain disadvantages. Therefore, the improvement of toughness is a major object of the development of the alumina.

That zirconia phases are finely dispersed in the alumina matrix so that the finely dispersed tetragonal zirconia will transfer to the monoclinic phase under stress and crack, and therefore the energy of crack in the alumina ceramics will be absorbed. When the zirconia phase does not contain a stabilizing agent, zirconia particles will maintain the tetragonal phase and be stable in the alumina matrix. The size of the particle needs to be less than the critical size (in order of 0.5 $\mu$m). However, such fine dispersion can not be produced in a commercial size for the production of the ceramic body. One was proposed in Japanese Patent Laid Open Gazette No. 54-25908 for the production of so fine dispersion wherein partially stabilized zirconia is added to the ceramic formulation so as to maintain the tetragonal phase even when the size of zirconia is more than the critical particle size.

In order to yield high density ceramics with a fine dispersion of zirconia in the ceramics, the higher temperature sintering such as at the temperature higher than 1500° C. under the atmospheric pressure, ordinarily the sintering temperature of higher than 1600° C. is necessary. When the lower sintering temperature is used for producing the high density ceramics, the higher pressure for sintering should be applied (HIP treatment). However, the sintering under higher pressure is not preferable and further, when the ceramics is sintered at the higher temperature under the atmospheric pressure, the grain growth of alumina and the grain growth of zirconia together with the transformation of the crystal to monoclinic phase may easily occur so as to decrease the strength with zirconia.

In accordance with the present invention, the sintering ability of the ceramics is improved by the combination of alumina phase and zirconia phase, so that the graing rowth of alumina and zirconia would be suppressed to result in a high density alumina zirconia ceramics with high breaking toughness and high abrasion resistance.

The inventive alumina zirconia ceramics is a functional ceramics having high strength and high tenacity, and it is expected to use for structural material such as mechanical material, abrasion resistant material, and cutting material and etc..

OBJECTS OF THE INVENTION

It is one object of the present invention to produce ceramics having high density and a controlled microstructure by suppressing the grain growth in the ceramics to have objective functions, for example, in the alumina zirconia ceramics, oxygen ion conductivity, thermal stability, mechanical properties and the like, and the inventive alumina zirconia ceramics have such objective functions as mechanical properties such as bending strength, tenacity and the like.

There has been produced dense alumina zirconia ceramics having controlled microstructure by a special moulding technique, and a high pressure sintering technique such as hot press technique or HIP method. However, these methods need complicated operation and special installations, and therefore, the resultant product will be very expensive.

On the other hand, there has been proposed a process for the production of ceramics which comprises preparing the raw material powder by using a chemical technique such as co-precipitation or the like and then sintering a moulding of the obtained raw material powder at a relatively low temperature range.

However, it is known that in general the more finely divided particulate material has the stronger cohesive force. Therefore, it is difficult to produce ceramics having high density with high reproducibility from the chemically treated raw powder.

Further, there has been proposed the addition of a sintering activator, for example, Japanese Laid open Gazette shou No. 5010351 describes a process for the production of ceramics comprising moulding and sintering a raw material powder which is obtained by adding aqueous ammonium to the mixed aqueous solution containing water soluble zirconium salt, water soluble salts of calcium, magnesium, yttrium and the like as a stabilizing agent(s), and water soluble salt of the transition metal for sintering activator, so as to precipitate the desired co-precipitated hydroxide containing the desired metals, then, drying and calcining thereof. The raw material powder can not provide satisfactory lower temperature sintering characteristics nor enough relative density of the ceramics.

In the above mentioned process, aqueous ammonium is used for precipitation. Some transition metals will form an amine complex with ammonium so that in practice aqueous ammonium can not be the cases of such transition metal.

In order to avoid this shortcoming, there is a process in that the oxides of the transition metals are used in place of the water soluble salt of the transition metals so as to be dispersed in the mixed solution containing the other components whereas the hydroxides of the other metal components are co-precipitated together with oxides of the transition metals.

F. F. Lange reported in Journal of Materials Science 17, 240–246(1982) states that "There is critical limit of the particle size of tetragonal phase respectively to $Y_2O_3$ content, and when the size exceeds the critical limit the tetragonal phase can not be present. Though the critical particle size is more than 1 $\mu$m at the $Y_2O_3$ content of 3 mol. %, it decreases to in order of 0.2 $\mu$m at the content of 2 molar %.

However, suppressing the growth of crystal grain in the ceramics, to control the size of the crystal grain equal to or less than 0.2 $\mu$m is extremely difficult by the prior art process for the production of the ceramics.

The characteristics of sintering at the lower temperature such that the grain size can be controlled to approximate 0.2 μm or less cannot be attained even by using the raw material powder prepared by the co precipitation.

As described above, the known alumina zirconia ceramic material is not satisfactory in view of improving the mechanical strength and stability, and therefore, ceramics with a higher tenacity and strength have been highly desired.

It is the object of the present invention to provide a process for the production of the raw material powder with characteristics of sintering at a lower temperature, which can be used for the production of the dense alumina zirconia ceramics as well as a process for the production for the dense alumina zirconia ceramics with controlled crystal structure.

It is another object of the invention to provide a method of the production of alumina zirconia ceramics with high fracture tenacity which comprise sintering at relatively lower temperature under atmospheric pressure the specified raw powder of alumina and zirconia.

DETAIL DESCRIPTION

The present invention comprises a high density alumina-zirconia ceramic body, the formulation of which comprises α-alumina ranging from 60 parts to 99 parts, zirconia containing more than 65% of tetragonal phase content ranging from 1 parts to 40 parts and transition metal oxide(s) the atomic ratio of which to the combination of aluminium and zirconium ranges 0.01 parts to 1 parts for the production of high density alumina-zirconia ceramic, which comprises moulding and sintering the raw material powder prepared by the above mentioned process.

When the content of zirconia is less than 1 mole %, the high toughness of the resultant ceramics can not be obtained. Further, when the content of zirconia exceeds 40 mole %, the hardness of the resulting ceramics will be decreased.

The high density alumina zirconia ceramic body of the present invention can be produced in accordance with the following method.

Zirconia powder having the grain size of less than 300 Å and BET relative surface area of more than 8 m$^2$/g or the precursor to generate the zirconia powder by heat decomposition, and α-alumina powder having the grain size of less than 1.0 μm and the BET relative surface area of more than 5 m$^2$/g, or the precursor to generate the α-alumina powder by heat decomposition are mixed in the solution or the dispersion containing compound(s) of at least one metal selected from the group consisting of Mn, Fe, Co, Ni, Cu and Zn and then removing the solvent and drying to yield the combined powder. The resultant powder is moulded in a shape, and then fired under room pressure at the temperature of lower than 1500° C. to sinter. The resultant sintered ceramic body is obtained.

The stabilizing agent may be $Y_2O_3$, CaO, MgO or $CeO_2$, as well as yttrium compounds, calcium compounds, magnesium compounds, or cerium compounds to generate respectively $Y_2O_3$, CaO, MgO, or $CeO_2$, by its thermal decomposition.

Ordinarily, $Y_2O_3$ is used as a stabilizing agent, and the amount to be added is less than 3 mole % in case of $Y_2O_3$, and less than 12 mole % in case of MgO or CaO, and the amount to be added to the ceramics composition is less than 14 mole % in case of $CeO_2$. If the content of the stabilizing agent exceeds the above limits, the toughness of the resulting ceramics will be lowered. The Zirconia powder used should have the grain size of less than 300 Å, and the BET specific surface area of more than 8 m$^2$/g, which may be prepared by any process. Further any precursor to generate such powder of the above mentioned properties upon heat decomposition or pyrolysis can be used in the present invention.

Any α-alumina of the above mentioend properties to satisfy the above explaiend condition or the precursor to generate such α-alumina can be used without any special limitation.

In accordance with the present invention, the raw material is produced as a combined deposit or co-precipitation of zirconium compound and alumina, from aqueous dispersion containing zirconium salt (or zirconium salt and a stabilizing agent) and alumina powder and precipitating agent, and thent he deposit is calcined to prepare the combined powder of alumina and zirconia. This combined powder is especially preferable for the production of the inventive ceramics.

In the concrete method of the raw material used for the inentive alumina zirconia ceramics, alumina powder is added to an aqueous solution of zirconium salt (or an aqueous solution of zirconium and stabilizing agnt) to prepare the aqueous dispersion. Then, the resulting dispersion is added to ammonia water and agitated and the precipitation is formed. Alternativelu, aqueous solution of zirconium salt (or aqueous solution of zirconium and stabilizing agent) is added to a dispersion of alumina powder and ammonia watr, and agitated and then, the precipitation is formed to prepare the raw material for the production of the alumina zirconia ceramics of the present invention. The zirconium salt is soluble in watr, and the regulation of the pH will produce the hydrated oxide. The resulting oxide may produce zirconia by calcining. Such salt may include oxychloride, oxynitrate, oxyacetate, oxysulfate and the like.

In the production of the ceramics, when the particle size of the raw material zirconia powder exceeds 300 Å, or when the BET specific surface of the zirconia powder is less than 8 m$^2$/g, or when the particle size of the raw material α-alumina exceeds 1.0 μm, or when the BET specific surface of the α-alumina is less than 5 m$^2$/g, the high density of the resulting ceramics can not be obtained only by sintering at the temperature of below 1500° C. In the other words, enough dense ceramics of high density can not be obtained by the atmospheric sintering at the lower temperature.

The atomic ratio of the transition metal to the combination of Al and Zr in the production of the ceramics may be in a range of from 0.01% to 1.0% part preferably 0.01 part to 0.5 part. If the ratio exceeds 1.0 part, the sintering properties are affected. And if the ratio is below 0.01%, sufficient dense ceramics of high density can not be obtained.

The transition metal compound(s) in this invention may be oxide of at least one metal selected from the group consisting of Mn, Fe, Co, Ni, Cu, and Zn as well as the compound(s) to generate one of the above mentioned metal ozide by its thermal decomposition. As the transition metal compound, there may be used inorganic compounds such as oxides, hydroxides, nitrates, chlorides and the like of the above mentioned metals:

organic acid salts such as oxalates, acetates, propionates, higher fatty acid salt and the like of the above mentioned metals: and organic metal compounds such as alkoxide compounds, chelate compounds and the like of the metals, even if it is not only soluble but also insoluble to the used solvents. Preferable one is solvent soluble compounds.

Removal and drying of solvent is carried out by the conventional evaporation method, but if the transition metal compound is not soluble in water nor organic solvent, or if the soluble compound is readily precipitated by using a preciptating agent, the filtration can be used for removal of solvent. Further, a spray drying technique can be applied for effective and efficient production of volume raw powder.

While the combined powder obtained from the mixture of zirconia powder (or the precursor thereof), α-alumina powder (or the precursor thereof), and the transition metal compound is preferably calcined at the temperature of 400° C. to 1000° C. particularly when the powder contains the precursor materials.

The conventional moulding technique can be satisfactorily used to form the raw material in a shape, but preferably the hydrostatic compression should be applied after moulding under the lower pressure so as to improve the sintered density and the mechanical strength of the final ceramic body.

The sintering of the moulding may be carried out by any of the conventional methods, and the ordinary sintering under the atmospheric pressure can be satisfactory to produce the enough dense ceramics.

The ceramics obtained by the inventive method has zirconia grain size in average of less than 1.0 μm, preferably less than 0.5 μm and the content of tetragonal phase of more than 65%, preferably more than 80%. The average size of alumina grain in the ceramics is less than 3 μm, preferably 2 μm or less.

As before mentioned, the improvement of the toughness and abrasion resistance of the alumina ceramics needs the uniform and fine dispersion of fine zirconia grains in the ceramics, but it needs high temperature sintering of the ceramics for obtaining the high density. If it is not sintered at the higher temperature, it will result inlowering of the hardness and toughness.

In accordance with the present invention, firing in the presence of the transition metal compound(s) including Mn, Fe, Co, Cu, Ni or Zn as a metal species will improve the sintering ability of the material to result in the excellent high density zlumina zirconia ceramics.

The high density alumina zirconia ceramics of the present invention can maintain higher content of tetragonal phase, even when zirconia content is increased in the ceramics having the lower content of the stabilizing agent. Therefore, the resulting ceramics can have higher hardness and higher toughness. This fact indicates that the grains in the ceramics is suppressed, and therefore, the fine zirconia grains are well and uniformly dispersed.

The transition metal compound(s) can suppress the grains of zirconia and alumina from growing in the ceramics, so that the resulting ceramics will be densified. On the other hand, $ZrO_2$ grains well dispersed in $Al_2O_3$ phase will suppress the grains of $Al_2O_3$ growing as well as suppress the transformation of tetragonal phase to monoclinic phase. Therefore, the toughness of the resulting ceramics is significantly increased.

These phenomenon functions synergically so that the toughness, hardness and abrasion resistance of the resulting ceramics are significantly imporved to have 12 $MN/m^{3/2}$ of $K_{1c}$.

BEST MODE FOR CARRYING OUT THE INVENTION

The best mode for carrying out the invention may be illustrated by the following examples. However, the following examples are not given for limitation of the scope of the invention.

EXAMPLE 1

(1) Production of Raw Material Powder

The pH of the combined solution containing $ZrOCl_2$, and $YCl_3$ was regulated to co-precipitate the deposit of the combined hydroxides. The resultant co-precipitation was calcined to yield thepartially stabilized zirconia having the content of $Y_2O_3$ as shown in Table 1, and the characteristics of powder as shown in Table 1. The resultant powder, α-alumina having the characteristics as shown in Table 2, and the nitrate of the transition metal were dissolved in ethanol, and the resultant ethanolic solution is put in pot for milling, and mixed and ground and then ethanol was evaporated to dry thereby to yield the raw powder for the production of ceramic body which have the contents of transition metal compound as shown in Table 3.

(2) Production of Ceramics

By pressure moulding the raw material powder so obtained, and then further hydrostatic compressing the mouldings obtained under pressure of 2 ton/cm², moulding shaving the desired shape was obtained. The obtained mouldings was fired under atmospheric pressure at a temperature as shown in Table 3, For reference, omitting the addition of the transition metal compounds, the raw materials wherein $Y_2O_3$ content is more than 3.0 mol %, that is, using the not preferred raw material characteristics of alumina powder and/or zirconia powder, the ceramic body was produced.

(3) Characteristics of Raw Material Powder and The Ceramics made therefrom.

The following characteristics were measured on the raw material powder and the ceramics obtained above. The data measured on the characteristics are shown in Tables 1, 2 and 3.

(A) Size of partially stabilized zirconia particle and α-alumina particle: D

The size D can be calculated from the width at the half value of the peak of X ray diffraction by the following Schellar's formula:

$$D = 0.9\lambda/\beta\cos\theta$$

λ: the wave length of X ray
β: the width at the half value of the diffraction peak
θ: the diffraction angle (B) BET Specific surface area of partially stabilized zirconia particle and α-alumina particle
was measured by usingmicromeritics (machine manufactured by Shimazu Works).

(C) Breaking Toughness Strength of high density alumina zirconia ceramics : $K_{1c}$
was mesured by Vickers indent test.

The Vickers indenter was pressed to the polished surface of the samples, and the resulting indentation size and the resulting length of the generated crack were measured and $K_{1c}$ was calculated from the following formula which Niihara et al proposed.

The applied indentation load was 50 kgf.

$(K_{1c} \Phi/H a^{\frac{1}{2}}) (H/E\Phi)^{0.4} = 0.129(C/a)^{-3/2}$

Φ: restraint moduras(−3)
H: Vickers hardness
E: modulus of elasticity.
a: half value of digonal length of indentation
c: length of crack generated from indentation.
(D) Bending strength of high density alumina zirconia ceramics:
was measured in accordance with JIS R 1601 (1981) rule.

The sample of 3×4×40 mm in size was used, and measurement was carried out on span length of 30 mm under crosshead speed of 0.5mm/min. and the value was determined by average from five samples.
(E) Content of tetragonal phase in the high density alumina zirconia ceramics The surface of the sample wa spolished by diamond slurry containing 3 μm in size of diamond particles, and then, X ray diffraction measurement was carried out on that surface followed by the calculation of the following formula.

$$\text{Tetragonal phase content (\%)} = \frac{(111)t}{(111)t + (111)m + (11\bar{1})m} \times 100$$

(111)t:tetragonal (111) face diffraction intensity
(111)m:monoclinic (111) face diffraction intensity
(11$\bar{1}$)m:monoclinic (11$\bar{1}$) face diffraction intensity
(111)t diffraction peak includes cubic (111)c diffraction peak, but the calculation was carried out presuming that that peak is entirely by tetragonal diffraction.
(F) Grain size in the high density alumina zirconia ceramics.

The grain size was measured byobserving the fracture face of the ceramics through scanning type electron microscope. It was confirmed that all samples except the reference samples have a tetragonal phase content of $ZrO_2$ in the resultant ceramics ranging more than 95%, the grain zise of $ZrO_2$ of 0.3 to 0.8 μm and the content of $Al_2O_3$ ranging between 1 to 2 μm.

EXAMPLE 2

Using acetate of transition metal, and methanol instead of ethanol, the procedures of Example 1 was repeated to obtain the raw material powder for the production of ceramic body, which contains transition metal compound. The resultant raw powder was shaped, calcined as in the procedure of Example 1, to yield the high density alumina zirconia ceramic body. The characteristics of the resultant ceramics were measured as in Example 1.

It was confirmed that all samples except the reference samples have than 95%, the grain size of $ZrO_2$ ranging between 0.5 to 1.0 μm, and the content of $Al_2O_3$ ranging between 1 to 3 μm.

EXAMPLE 3

A given amount of α-alumina powder (grain size:0.4 μm, specific surface area: 8 m²/g) was added to an aqueous solution of $ZrOCl_2$ (or aqueous solution of $ZrOCl_2$ containing a stabilizing agent) and agitated by ball milling to form uniform dispersion. The resultant dispersion was then added to excess ammonia water at such rate that the pH thereof was maintained at more than 9, and agitated, and then the resultant precipitation was filtered, washed with water, and dried to yield the combined deposit compound of alumina and zirconium compound.

Then, the resultant powder andnitrate of transition metal were dissolved in ethanol solution and put in a milling pot, and mixed, ground and then ethanol was evaporated to be dry so that the raw material powder was obtained for the production of the ceramic body. The resultant grain size of $ZrO_2$ in the combined powder was 200 Å.

The resultant raw powder was shaped, and calcined as in the procedure, to yield thehigh density alumina zirconia ceramic body. The characteristics of the resultant were measured as in Example 1. The result of the measurement are shown in Table 3.

It was confirmed that all samples have a tetragonal phase content of $ZrO_2$ in the resultant ceramics ranging between more than 95%, the grain size of $ZrO_2$ ranging between 0.5 to 1.0 μm, and the content of $Al_2O_3$ of 1 to 3 μm.

TABLE 1

| Species of Powder | Powder Characteristics of Raw Zirconia | | | |
|---|---|---|---|---|
| | Calcining Temp. (°C.) | Amount of $Y_2O_3$ (mol %) | Grain Size (Å) | Specific Surface Area (m²/g) |
| Z-1 | 800 | 0 | 150 | 30 |
| Z-2 | 900 | 1.2 | 200 | 22 |
| Z-3 | 600 | 1.7 | 120 | 42 |
| Z-4 | 950 | 2.0 | 200 | 15 |
| Z-5 | 800 | 2.5 | 150 | 32 |
| Ref Z-6 | 1100 | 1.7 | 350 | 5 |
| Ref Z-7 | 900 | 5.0 | 200 | 23 |

TABLE 2

| Species of Powder | Powder characteristics of Raw Alumina | |
|---|---|---|
| | Grain Size (μm) | Specific Surface Area (m²/g) |
| A-1 | 0.6 | 7 |
| A-2 | 0.6 | 6 |
| A-3 | 0.1 | 30 |
| A-4 | 0.4 | 8 |
| Ref A-5 | 2.0 | 2 |

TABLE 3

| No. | Raw Powder | | Added Transition Metal | | PSZ amount mol % | Sintering Temp. °C. | Sintered Density g/cm³ | KIC MN/m^{3/2} | Vickers Hardness kg/mm² | Bending Strength kg/mm² |
|---|---|---|---|---|---|---|---|---|---|---|
| | $Al_2O_3$ | $ZrO_2$ | Species | Amount mol % | | | | | | |
| Sintering Condition and Characteristics of Ceramic Body (1) | | | | | | | | | | |
| Example | | | | | | | | | | |
| 1-1 | A-1 | Z-1 | Mn | 0.3 | 10 | 1500 | 4.15 | 8.0 | 1650 | 80 |

TABLE 3-continued

| No. | Raw Powder Al₂O₃ | Raw Powder ZrO₂ | Added Transition Metal Species | Added Transition Metal Amount mol % | PSZ amount mol % | Sintering Temp. °C | Sintered Density g/cm³ | KIC MN/m^(3/2) | Vickers Hardness kg/mm² | Bending Strength kg/mm² |
|---|---|---|---|---|---|---|---|---|---|---|
| 1-2 | " | Z-3 | " | 0.2 | 20 | 1450 | 4.32 | 8.5 | 1620 | 82 |
| 1-3 | " | " | " | 0.3 | 20 | " | 4.33 | 8.8 | 1600 | 90 |
| 1-4 | " | " | Cu | 0.3 | 10 | 1500 | 4.15 | 6.8 | 1680 | 77 |
| 1-5 | " | " | " | 0.3 | 20 | 1450 | 4.31 | 8.2 | 1630 | 85 |
| 1-6 | A-2 | Z-2 | Zn | 0.2 | 30 | 1400 | 4.51 | 10.2 | 1580 | 98 |
| 1-7 | " | Z-3 | Mn | 0.2 | 10 | 1500 | 4.14 | 7.0 | 1700 | 82 |
| 1-8 | " | " | " | 0.3 | 10 | 1450 | 4.13 | 7.2 | 1670 | 80 |
| 1-9 | " | " | Co | 0.3 | 20 | " | 4.33 | 8.5 | 1610 | 89 |
| Reference | | | | | | | | | | |
| 1-10 | A-1 | Z-3 | — | — | " | 1500 | 4.00 | 5.2 | 1520 | 42 |
| 1-11 | A-2 | " | — | — | " | " | 3.92 | 5.2 | 1500 | 53 |
| 1-12 | " | Ref Z-7 | Mn | 0.3 | " | " | 4.02 | 5.1 | 1520 | 50 |
| 1-13 | A-1 | Ref Z-6 | " | " | " | " | 4.08 | 6.0 | 1540 | 59 |
| 1-14 | Ref A-5 | Z-1 | " | " | " | " | 3.90 | 5.0 | 1480 | 40 |
| Sintering Condition and Characteristics of Ceramic Body (2) | | | | | | | | | | |
| Example | | | | | | | | | | |
| 2-1 | A-3 | Z-1 | Mn | 0.3 | 10 | 1450 | 4.16 | 7.0 | 1700 | 85 |
| 2-2 | " | " | Co | 0.2 | 10 | " | 4.15 | 7.2 | 1670 | 87 |
| 2-3 | " | Z-3 | Mn | 0.2 | 20 | " | 4.33 | 8.3 | 1650 | 93 |
| 2-4 | " | " | Ni | 0.3 | 30 | 1400 | 4.51 | 9.2 | 1580 | 98 |
| 2-5 | " | Z-5 | Mn | 0.3 | 40 | 1400 | 4.71 | 12.0 | 1550 | 102 |
| 2-6 | " | " | Cu | 0.3 | 20 | 1450 | 4.32 | 7.5 | 1620 | 85 |
| 2-7 | A-4 | Z-2 | Fe | 0.4 | 10 | 1500 | 4.15 | 8.0 | 1680 | 82 |
| 2-8 | " | " | Zn | 0.2 | 20 | 1450 | 4.33 | 8.5 | 1620 | 88 |
| 2-9 | " | Z-3 | Mn | 0.3 | 10 | 1500 | 4.15 | 7.6 | 1690 | 78 |
| 2-10 | " | " | Ni | 0.2 | 20 | 1450 | 4.31 | 8.2 | 1630 | 88 |
| 2-11 | " | " | " | 0.3 | 30 | 1400 | 4.52 | 11.0 | 1570 | 92 |
| 2-12 | " | Z-4 | Co | 0.3 | 40 | " | 4.70 | 12.0 | 1520 | 90 |
| 3-1 | " | — | Mn | 0.3 | 10 | 1450 | 4.16 | 8.2 | 1750 | 85 |
| 3-2 | " | — | " | 0.3 | 20 | 1400 | 4.33 | 8.6 | 1700 | 95 |
| Reference | | | | | | | | | | |
| 2-13 | A-3 | Z-3 | — | — | 20 | 1500 | 4.18 | 5.8 | 1530 | 60 |
| 2-14 | A-4 | " | — | — | 20 | " | 4.20 | 5.8 | 1510 | 62 |

INDUSTRIAL APPLICABILITY

The high density alumina zirconia ceramic body of the present invention is as shown in Examples, highly dense, and has excellent breaking toughness value ($K_{ic}$), with high bending strength and hardness.

In accordance with the present invention, a high density alumina zirconia ceramic body can be produced by using finely divided zirconia powder and a sinter-accelerating effect by transition metal compound(s). In the inventive ceramics, zirconia crystal is restrained to grow so that crystal phase of zirconia particle in the ceramics makes it possible to maintain the tetragonal phase of zirconia in the ceramics even when the content of partially stabilized zirconia is increased, and even when the content of the stabilizing agent is reduced. Further, the crystal growth of alumina in the ceramics is suppressed.

By these two acts of suppression of the crystal growth the resultant ceramic body is imporved so that the breaking toughness value is increased to 12 MN/m^(3/2). Further, the resultant ceramics has improved bending strength, and the improved hardness.

Therefore, the ceramic body of the present invention is expected to be used as a strong structural ceramic member such as abrasion resistant material, and mechanical member, and is useful in application such as cutting tool, and can be used for high performance material.

In view of the foregoing, the presetn invention provides alumina zirconia ceramics with high density, high strength, high hardness and excellent toughness, and a method of production thereof. Therefore, the present invention is of industrial significance.

What is claimed is:

1. A high density alumina-zirconia ceramic body, the formulation of which comprises alumina ranging from 60 mol percent to 99 mol prcent; zirconia, wherein more than 65 percent of said zirconia is in the tetragonal phase, ranging from 1 mol percent to 40 mol percent; and, an oxide of at least one transition metal element selected from the group consisting of Mn, Fe, Co, Ni, Cu, and Zn, in an amount that said transition metal atom to Al and Zr ranges from 0.01 to 1 percent.

2. A ceramic body as claimed in claim 1, wherein the average grain size of the alumina is less than 3 μm.

3. A ceramic body as claimed in claim 1, wherein the average grain size of zirconia is less than 1 μm.

4. A ceramic body as claimed in claim 1, wherein the zirconia is a partially stabilized zirconia in which there is $Y_2O_3$ is an amount of less than 3 mol percent as a stabilizing agent.

5. A process for the production of a high density alumina-zirconia ceramic body, the formulation of which comprises alumina ranging from 60 mol percent to 99 mol percent; zirconia, wherein more than 65 percent of said zirconia is in the tetragonal phase, wanging from 1 mol percent to 40 mol percent and an oxide of at least one transition metal element selected from the group consisting of Mn, Fe, Co, Ni, Cu and Zn in an amount that said transition metal atom to Al and Zr ranges from 0.01 to 1 percent, which comprises the steps of (a) mixing the following (i), (ii), and (iii)

(i) alumina powder, or a precursor powder to generate alumina by heat decomposition,
(ii) zirconia powder, or a precursor powder to generate zirconia by heat decomposition, and,
(iii) a solution or dispersion containing at least one transition metal element selected from the group consisting of Mn, Fe, Co, Ni, Cu, and Zn,
(b) removing the solvent from said mixture,
(c) drying the resultant mixture to produce a raw material powder, and,
(d) shapng and sintering the aforementioned raw material powder.

6. The process for the production of a ceramic body as claimed in claim 1, wherein the crystal particle size of the zirconia powder is less than 300 Å, the BET specific surface area of the zirconia powder is more than 8 $m^2/g$, the crystal particle size of the alumina powder is less than 1 $\mu$m and the BET specific surface area of the alumina powder is more than 5 $m^2/g$.

7. A process for the production of a ceramic body as claimed in claim 5, wherein an alumina-zirconia combined powder is used, said powder being produced by calcining the precipitation which is produced by mixing the dispersion of alumina powder and an aqueous solution containing a zirconium salt with a precipitating agent in step (a).

* * * * *